United States Patent [19]

Derrien et al.

[11] 4,361,422
[45] Nov. 30, 1982

[54] HYDROGENATION AND ETHERIFICATION OF AN UNSATURATED C$_5$ HYDROCARBON CUT TO INCREASE ITS OCTANE NUMBER AND DECREASE ITS MONO-OLEFIN CONTENT

[75] Inventors: Michel Derrien, Rueil Malmaison; Jean Cosyns, Maule; Bernard Torck, Boulogne sur Seine, all of France

[73] Assignee: Institut Francais du Petrole, Rueil-Malmaison, France

[21] Appl. No.: 242,218

[22] Filed: Mar. 10, 1981

[30] Foreign Application Priority Data

Mar. 10, 1980 [FR] France ............................ 80 05365

[51] Int. Cl.$^3$ .............................................. C10L 1/18
[52] U.S. Cl. ........................................ 44/56; 568/697
[58] Field of Search ............... 44/77, 56, 53; 208/144, 208/143; 568/697

[56] References Cited

U.S. PATENT DOCUMENTS

| | | | |
|---|---|---|---|
| 3,037,052 | 5/1962 | Bortnick | 560/193 |
| 3,482,952 | 12/1969 | Sieg et al. | 44/56 |
| 4,193,770 | 3/1980 | Chase et al. | 44/77 |

*Primary Examiner*—Charles F. Warren
*Assistant Examiner*—Y. Harris-Smith
*Attorney, Agent, or Firm*—Millen & White

[57] ABSTRACT

An unsaturated C$_5$ fraction comprising at least 10% of a mixture (A) of 2-methyl-1-butene with 2-methyl-2-butene and optionally isoprene and at least 10% of a mixture (B) of other mono-olefins and diolefins is hydrogenated under controlled conditions and thereafter etherified with an alcohol having from 1 to 4 carbon atoms. A gasoline fraction of high motor octane number and low olefin content is thus obtained.

17 Claims, No Drawings

HYDROGENATION AND ETHERIFICATION OF AN UNSATURATED C$_5$ HYDROCARBON CUT TO INCREASE ITS OCTANE NUMBER AND DECREASE ITS MONO-OLEFIN CONTENT

BACKGROUND OF THE INVENTION

This invention concerns a process for producing a gasoline fraction of high octane number and low to nil content of olefinic hydrocarbon.

The pyrolysis processes, for example, steam-cracking, catalytic cracking and coking are among the most important processes for producing gasoline. By way of example, steam-cracking of hydrocarbons provides, in addition to ethylene, various products including a C$_5$ or C$_5$+ fraction, for example, a C$_5$+ fraction having a final boiling point between 150° and 220° C.

According to a known treatment, the most unsaturated hydrocarbons of these fractions, such as the diolefinic hydrocarbons and the alkenylaromatic hydrocarbons are hydrogenated without substantial conversion of the mono-olefinic and alkylaromatic hydrocarbons to saturated hydrocarbons. In certain cases, only the C$_5$ fraction is treated, the C$_6$–C$_8$ hydrocarbons being previously separated and reserved to the production of aromatic hydrocarbons; in other cases, the whole C$_5$+ cut is subjected to hydrogenation.

Gasolines of high mono-olefins content are thus obtained, the octane number of which is not fully satisfactory since, although the research octane number (F$_1$) is high, the motor octane number (F$_2$) is low. This is particularly the case for of the C$_5$ fractions whose clear F$_1$ is about 95 but clear F$_2$ is only about 80.

Another source consists of catalytic cracking gasolines, for example fluid bed catalytic cracking gasoline (FCC). This gasoline of high mono-olefins content is practically free of diolefins and alkenylaromatic hydrocarbons; it can be used as such without further hydrogenation as applied to steam-cracking gasolines.

It is also known that the C$_5$ fractions containing monoolefins can be modified by reaction with an alcohol in the presence of an acid catalyst: the C$_5$ mono-olefins having a tertiary carbon atom as part of the unsaturated double bond, i.e. 2-methyl-1-butene and 2-methyl-2-butene, react rather selectively to yield an ether. This operation has a double advantage: the motor octane number (MON) increases as the result of the conversion of low MON olefins to high MON ether; on the other hand, due to a decrease of the olefins content, the lead susceptibility increases, which is advantageous since, in many countries, a reduction of the lead additive content of gasoline is required.

It appears that, although the Research octane number and the Motor octane number are routinely determined, the Motor octane number is closer to the truth and conforms better to the present motor requirements. Thus, in the German Federal Republic, a new rule imposes a minimum motor octane number in addition to the required research octane number. Also in the USA, the average value of the octane numbers:

$$(F_1+F_2)/2$$

is taken into consideration.

The modification of a gasoline or of a C$_5$ fraction by conversion of 2-methyl-1-butene (M2B1) and 2-methyl-2-butene (M2B2) to methyl tert.amyl ether has already been proposed, for example in the British Pat. No. 1 176 620, the U.S. Pat. No. 3 482 952 and the French Pat. No. 2 411 881. The latter patent suggests applying the process to a partially hydrogenated gasoline fraction, obtained by steam-cracking of naphtha or heavier hydrocarbon cuts: this partially hydrogenated gasoline fraction is distilled to yield a C$_5$ cut which is thereafter reacted with methanol.

The partial hydrogenation, also called selective hydrogenation, of a steam-cracking C$_5$ cut (or of gasoline comprising this cut) results in the conversion of at least 90% of the C$_5$ aliphatic and cycloaliphatic diolefins to mono-olefins, the conversion of the mono-olefins (initial + formed from the diolefins) being itself low or nil, for example about 10 to 20% at the most.

It results therefrom that, when esterifying this cut with an alcohol, there is obtained a C$_5$ cut comprising an ether (tert.amyl methyl ether or TAME when starting from methanol) and a high proportion of mono-olefins, essentially n-monoolefins and cyclomono-olefins which have not reacted with the alcohol.

SUMMARY OF THE INVENTION

It has now been found that it is advantageous to subject a pyrolysis C$_5$ cut (or gasoline comprising this cut, provided the C$_5$ cut is thereafter withdrawn therefrom) to a more extensive hydrotreatment, in such manner that present and potential M2 B1 and M2 B2 (potential means derived from partial hydrogenation of isoprene) remain unconverted to saturated hydrocarbons, or converted in a proportion lower than 10%, preferably less than 5% into such hydrocarbons, while the other olefins (mono- and di-olefins) are converted into saturated hydrocarbons in a proportion of more than 30%, preferably 50 to 90%. The resultant hydrogenated C$_5$ cut (optionally after separation rom the remainder of the gasoline when a gasoline fraction has been subjected to hydrogenation) contains practically all the mono-olefins convertible into the desired ether, for example TAME; it is thereafter etherified with an alcohol in a known manner. A C$_5$ fraction is thus obtained, which has a high ether and saturated hydrocarbons content and a low olefinic hydrocarbons content, generally lower than 20%, for example, from 2 to 10% by weight, which represents a first advantage. This cut has a higher motor octane number than the cut obtained when directly etherifying a C$_5$ cut of high mono-olefin content, as obtained by catalytic cracking or by conventional selective hydrogenation of a steam-cracking gasoline, and this represents a second advantage.

DETAILED DISCUSSION

The mechanism of the relatively extensive hydrogenation carried out in the invention is largely based on the following considerations: the diolefins are practically entirely hydrogenated to mono-olefins, the terminal mono-olefins of the 1-pentene or 3-methyl-1-butene (M3B1) type are largely isomerized respectively to 2-pentene or 2-methyl-2-butene with partial hydrogenation of the n-pentenes and of cyclopentene. It results therefrom, as experimentally observed, an increase of the motor octane number, which is the weak point of these C$_5$ pyrolysis cuts, as well as an increase of the content of etherifiable M2 B1 and M2 B2, thus an increase of the octane number by etherification.

Another important point to be taken into account is the following: it has been observed that the improvement of the octane number attributable to TAME is much larger when this compound is mixed with saturated hydrocarbons than when it is mixed with ethylenic hydrocarbons. There is thus obtained, according to the invention, an increased beneficial effect when adding TAME.

When working with a FCC C$_5$ cut, practically no diolefin is present; the hydrogenation reaction is thus mainly an isomerization and hydrogenation of the linear olefins and an isomerization of M3 B1, which offers similar advantages.

The known catalysts are not all equivalent for conducting this hydrogenation. It has been found that a palladium catalyst is particularly well adapted, provided it is used under relatively severe operating conditions. This catalyst is usually formed of 0.2 to 2% by weight of palladium with a carrier, for example, alumina or silica.

A nickel catalyst can also be used. A preferred embodiment comprises using at least one nickel catalyst bed followed with at least one palladium catalyst bed.

The conditions of the hydrogenation reaction are so selected as to obtain the above defined desired conversion rate. A few simple preliminary experiments allow at best a determination of these conditions in each particular case. When operating with a previously isolated C$_5$ cut, the hydrogenation temperature is usually selected between 50° and 200° C., the preferred temperature at the outlet of the reaction zone being at least 120° C.; the pressure is advantageously selected between 5 and 60 bars, preferably between 20 and 50 bars; the hourly feed rate of the liquid charge (VVH) is from 0.5 to 10, preferably from 2 to 4 volumes per volume of catalyst.

When working with a C$_5$-final point gasoline whose final point is, for example, 150° to 220° C., the temperature is 50°–220° C., with a preferred outlet temperature of at least 150° C.; the pressure and the hourly feed rate are as above.

It is clear that these operating conditions are not independent, and accordingly it is difficult to give them with greater precision. All other conditions being unchanged, the hydrogenation is the more complete as the temperature and the hydrogen pressure are higher and the space velocity of the charge is lower. One or more successive catalyst beds can be used, as well as the conventional methods to remove the reaction heat, for example, recycling the hydrogenated product, at the inlet or at selected points of the reaction zone.

The etherification reaction is effected with an alcohol, for example, an aliphatic C$_1$ to C$_4$ alcohol, preferably methanol or ethanol, under known conditions, comprising a temperature of 50° to 120° C. and a sufficient pressure to maintain the reactants at least partly in the liquid phase. The total conversion rate of 2-methyl-1-butene and 2-methyl-2-butene is, for example, 40 to 90% or more. The reactants can be used in equimolar proportions or in different proportions. At the outlet of the etherification zone, the unconverted alcohol can be separated, for example, by fractionation or by washing.

The etherification catalyst is an acid catalyst, preferably formed of ion exchange resin in the solid form, the best results being obtained with solid macroporous sulfonic resins as, for example, disclosed in the U.S. Pat. No. 3 037 052.

The usual techniques can be used with, for example, a fixed or dispersed catalyst, in one or more beds, with optional recycling of a portion of the resulting products or the unconverted materials, either as such or after heating or cooling. A preferred embodiment comprises passing the reactants first through an expanded catalyst bed and thereafter through a fixed catalyst bed, thus obtaining a better selectivity and an increased life time of the catalyst.

The alcohol and the reactive olefins (M2 B1 and M2 B2) can be used in equimolar proportions or in excess to each other, according to the known technique.

The fractionation of the resultant products can be effected in any manner; however the reactor effluent can be used as such as gasoline component; this embodiment is even preferred, as stated above.

The C$_5$ fractions to which the invention more particularly applies comprise, before hydrogenation (the latter can be effected with the previously isolated C$_5$ cut or with a wider cut including C$_5$ hydrocarbons; in the latter case, the C$_5$ cut is isolated after hydrogenation, but before etherification), at least 10% by mole of the following hydrocarbons, as a whole: isoprene+M2 B2+M2 B1; and at least 10% of other C$_5$ mono-olefins and di-olefins. After hydrogenation, the M2 B1+M2 B2 content is normally at least 15% by weight, more often between 15 and 40% by weight.

After etherification, the C$_5$ cut comprises, for example, 40 to 70% of saturated hydrocarbons, 5 to 30% of mono-olefinic hydrocarbons, 15 to 35% of ether and 2 to 10% of alcohol by weight. The alcohol is preferably methanol and the ether is preferably TAME.

EXAMPLE 1

A C$_5$ steam-cracking cut is hydrogenated in the presence of a fixed bed catalyst containing 0.3% by weight of palladium on alumina (specific surface: 80 m$^2$/g). Three sets of operating conditions A, B and C are selected, which permit to hydrogenate more or less (Table I). Only the sets B and C conform to the invention. The set A corresponds to a conventional hydrogenation. The composition of the charge and of each hydrogenation product is given in Table II. The yield by weight of hydrogenation product is practically quantitative in the three cases.

TABLE I

| OPERATING CONDITIONS | A | B | C |
| --- | --- | --- | --- |
| Reactor inlet temperature (°C.) | 50 | 50 | 50 |
| Reactor outlet temperature (°C.) | 120 | 130 | 150 |
| Pressure (bars) | 35 | 35 | 35 |
| Hydrogen partial pressure (reactor outlet) | 9 | 12 | 15 |
| VVH (vol/vol. hour) | 3.5 | 3 | 2 |

TABLE II

| COMPOSITION (% b.w.) | CHARGE | PRODUCT A | PRODUCT B | PRODUCT C |
| --- | --- | --- | --- | --- |
| Isoprene | 13 | 1 | 0.1 | <0.1 |
| Cyclopentadiene | 25 | 0.2 | <0.1 | <0.1 |
| Pentadienes | 12 | 0.5 | <0.1 | <0.1 |
| M2B1 + M2B2 | 12 | 23.5 | 25.2 | 24.7 |
| M3B1 | 1 | 2 | <0.1 | <0.1 |
| n-olefins | 10 | 19 | 15.2 | 0.5 |
| Cyclopentene | 2 | 18.5 | 11 | <0.1 |
| Saturated hydrocarbons | 25 | 35.3 | 48.5 | 74.8 |

The hydrogenated C$_4$ cut is thereafter etherified in an apparatus comprising two successive reactors operating in liquid phase; the first reactor contains a catalyst maintained in expanded bed by the ascending stream of the reactants with recycling of a portion of the effluent to the inlet of this reactor. The second reactor is of the fixed bed type. In both reactors, the catalyst is a macroporous sulfonic resin (Amberlyst 15) as particles of 0.4 to 1 mm.

The average temperature is 72° C. in the first reactor and 55° C. in the second reactor. The ratio methanol/M2B1+M2B2 is 1.3.

This arrangement has been disclosed, for example, in the French Pat. No. 2 440 931.

Table III summarizes the composition and the properties of the products called respectively A', B' and C'.

TABLE III

| COMPOSITION (% b.w.) | PRODUCT A' | PRODUCT B' | PRODUCT C' |
| --- | --- | --- | --- |
| Saturated hydrocarbons | 31.2 | 42.2 | 65.7 |
| Total olefins | 41.9 | 29.2 | 6.2 |
| TAME | 21.3 | 22.7 | 22.3 |
| Methanol | 5.6 | 5.9 | 5.8 |
| Bromine number | 96 | 67 | 14 |
| MON (Motor octane number with 0.15 g/l Pb). | 86 | 87.2 | 88 |

It appears that products B' and C' have a higher MON than product A'.

EXAMPLE 2

A steam-cracking $C_5$-200° C. cut is partly hydrogenated on a nickel-on-alumina catalyst.

The hydrogenation product is fractionated and the $C_5$ cut (final point: 60° C.) is subjected to an etherification treatment in the conditions of example 1.

| Hydrogenation feedstock | |
| --- | --- |
| Distillation | 30-200° C. |
| Bromine number | 70 |
| Maleic anhydride value | 90 |
| % diolefins + alkenylaromatics | 23 |
| % $C_5$ | 18 |
| % sulfur | 400 ppm |

Operating conditions

Catalyst of nickel on alumina (10% b.w. nickel content) P=45 bars Inlet T=90° C. Outlet T=170° C. VVH=1,6.

These conditions are so selected as to allow, further to the hydrogenation of the diolefins and alkenylaromatics, a partial hydrogenation of the non-etherifiable olefins, i.e. cyclopentene and and the n-pentenes.

After hydrogenation, the $C_5$ cut is fractionated by distillation.

The results are given in Table IV: analysis of the $C_5$ hydrocarbons present in the initial gasoline (column 1) and of the $C_5$ cut separated from the hydrogenated gasoline (column 2); analysis of the above $C_5$ cut, after etherification (column 3).

The yield by weight of the hydrogenation is practically quantitative.

TABLE IV

| COMPOSITION % b.w. | 1 of the $C_5$ hydrocarbons of the $C_5$—200° C. hydrogenation feedstock | 2 of the $C_5$ cut after hydrogenation and fractionation | 3 of the final product |
| --- | --- | --- | --- |
| n-pentane | 13.3 | 32.04 | 26.9 |
| Isopentane | 5.5 | 8.73 | 7.3 |
| Cyclopentane | 3 | 8.22 | 6.9 |
| 1-pentene | 3.1 | 1.40 | 1.17 |
| 2-pentene | 4.3 | 12.62 | 10.54 |
| M3B1 | 1 | 0.18 | 0.15 |
| M2B1 | 7.4 | 5.38 | 0.62 |
| M2B2 | 4.9 | 27.19 | 7.28 |
| Cyclopentene | 2.5 | 4.14 | 3.46 |
| Isoprene | 9 | | |
| Pentadiene | 9 | 0.1 | 0.08 |
| Cyclopentadiene | 37 | | |
| TAME | 0 | 0 | 28.2 |
| Methanol | 0 | 0 | 7.4 |
| MON (Motor octane number with 0.15 g/l Pb) | — | 82.5 | 87.5 |

It appears that the etherifiable olefin content of the $C_5$ cut fractionated after hydrogenation of the total $C_5$-200° C. cut is higher than that of a $C_5$ cut hydrogenated after fractionation: this results from the fact that the cyclopentadiene dimerisation, simultaneous to the hydrogenation, yields $C_{10}$ hydrocarbons. The latter are eliminated during the subsequent fractionation of the hydrogenated gasoline, so that the relative concentration of etherifiable olefins is greatly increased with simultaneous strong reduction of the cyclic $C_5$ hydrocarbons content.

This removal of cycloolefins is favourable to the obtainment of high octane number after etherification.

EXAMPLE 3

A $C_5$ catalytic cracking cut (mixture A) is hydrogenated over a catalyst comprising 0.3% palladium on alumina and the products B and C are obtained (C has been more strongly hydrogenated than B) in the conditions of Table V. The yield by weight is practically quantitative.

TABLE V

| OPERATING CONDITIONS | B | C |
| --- | --- | --- |
| Inlet reactor T (°C.) | 130 | 160 |
| Outlet reactor T (°C.) | 150 | 190 |
| VVH (m³/m³ · h) | 5 | 4 |
| P (bars) | 40 | 40 |

The products of Table IV are thus obtained.

TABLE VI

| % b.w. | $C_5$ catalytic cracking cut (A) | Hydrotreatment product (B) | Hydrotreatment product (C) |
| --- | --- | --- | --- |
| Saturated | 58.1 | 65.82 | 73.07 |
| 1 Pentene | 2.9 | 0.80 | 0.3 |
| 2-cis Pentene | 5.7 | 3.26 | 1.81 |
| 2-tr Pentene | 6.8 | 7.92 | 3.32 |
| M3B1 | 0.9 | <0.1 | <0.1 |
| M2B1 | 2.4 | 1.60 | 1.1 |
| M2B2 | 18.4 | 20.10 | 20.4 |
| Cyclopentene | 2.2 | 0.50 | <0.1 |
| Diolefins | 1.35* | <0.1 | <0.1 |
| Br. N. (gBr²/100g) | 94 | 78 | 60 |
| F1 clear | 93 | 92 | 89.5 |

TABLE VI-continued

| % b.w. | $C_5$ catalytic cracking cut (A) | Hydro-treatment product (B) | Hydro-treatment product (C) |
|---|---|---|---|
| F2 clear | 80.5 | 81.5 | 82.5 |

*including 0.4 isoprene.

The mixture A and the hydrotreatment products (B) and (C) are etherified in the same conditions as in example 1. Table VII shows the composition and characterics of the products named respectively A', B' and C'.

TABLE VII

|  | PRODUCT A' | PRODUCT B' | PRODUCT C' |
|---|---|---|---|
| Composition (% b.w.) | | | |
| Saturated hydrocarbons | 51.7 | 58.3 | 64.8 |
| Total olefins | 24.2 | 16.6 | 10.3 |
| TAME | 19.1 | 19.9 | 19.7 |
| Methanol | 5.0 | 5.2 | 5.2 |
| Bromine number | 55 | 37 | 23 |
| RON clear ($F_1$) | 96.5 | 95.8 | 94.8 |
| RON ethylated 0,4 g/l | 103.8 | 103.3 | 102.5 |
| MON clear ($F_2$) | 83 | 84.5 | 85.3 |
| RON ethylated 0,4 g/l | 89 | 91.5 | 93.2 |

What is claimed is:

1. A process for producing a gasoline fraction of high motor octane number and low olefins content from a $C_5$ unsaturated fraction comprising at least 10% by weight of a mixture (A) comprising 2-methyl-1-butene and 2-methyl-2-butene; and at least 10% by weight of a mixture (B) comprising the $C_5$ monoolefins other than those of mixture (A), comprising the steps of:
   catalytically hydrogenating the $C_5$ unsaturated fraction in such a manner as to convert at least 30% of mixture (B) to saturated hydrocarbons while limiting the conversion of mixture (A) to saturated hydrocarbons to at most 10%; and
   etherifying at least a portion of the 2-methyl-1-butene and 2-methyl-2-butene in the resultant effluent with an aliphatic $C_{1-4}$ alcohol.

2. A process according to claim 1, wherein the $C_5$ fraction subjected to hydrogenation is a previously isolated $C_5$ fraction and the hydrogenation is effected at 50°-200° C., with an outlet temperature of at least 120° C., a pressure of 5-60 bars and a hourly feed rate of the liquid charge of 0.5-10 volumes per volume of hydrogenation catalyst.

3. A process according to claim 1, wherein the hydrogenation is so controlled that the conversion of mixture (A) is lower than 5% and the conversion of mixture (B) is 50-90%.

4. A process according to claim 1, wherein the hydrogenation is so controlled as to obtain an olefin concentration after etherification of at most 20% by weight.

5. A process according to claim 1, wherein the hydrogenation is so controlled as to obtain an olefin concentration after etherification of 2-10% by weight.

6. A process according to claim 1, wherein the unsaturated $C_5$ fraction is a $C_5$ catalytic cracking cut.

7. A process according to claim 1, wherein the unsaturated $C_5$ fraction is a $C_5$ steam-cracking cut.

8. A process according to claim 1, wherein the hydrogenation is effected with a gasoline feed comprising said $C_5$ fraction at a temperature of 50°-220° C., an outlet temperature of at least 150° C., a pressure of 5-60 bars and an hourly feed rate of the liquid charge of 0.5-10 volumes per volume of the hydrogenation catalyst; and the $C_5$ hydrogenated cut is separated from the hydrogenation effluent and etherified.

9. A process according to claim 1, wherein the hydrogenation is so conducted as to obtain a 15-40% by weight content of 2-methyl-1-butene and 2-methyl-2-butene in the resultant effluent.

10. A process according to claim 1, wherein the free alcohol present after etherification is left in the $C_5$ cut, and the resultant product comprises 40-70% of $C_5$ saturated hydrocarbons, 5-30% of $C_5$ monoolefinic hydrocarbons, 15-30% of ether and 2-10% of alcohol by weight.

11. A process according to claim 1, wherein the total conversion of 2-methyl-1-butene and 2-methyl-2-butene in the etherification step is 40-90%.

12. A process according to claim 1, wherein mixture (A) further comprise isoprene, and mixture (B) further comprises $C_5$ diolefins other than isoprene.

13. A process according to claim 1, wherein the hydrogenation is effected in the presence of a palladium catalyst.

14. A process according to claim 13, wherein said catalyst is 0.2-2% by weight palladium on alumina.

15. A process according to claim 1, wherein the hydrogenation is effected in the presence of a nickel on alumina catalyst.

16. A process according to claim 1, wherein the etherification is effected with methanol or ethanol.

17. A process according to claim 16, wherein the alcohol is methanol.

* * * * *